United States Patent [19]

Baker

[11] 4,281,371

[45] Jul. 28, 1981

[54] CYCLOCONVERTER WITH WAVEFORM IMPROVING NONLINEAR FEEDBACK

[75] Inventor: Donal E. Baker, American Township, Allen County, Ohio

[73] Assignee: Westinghouse Electric Corp., Pittsburgh, Pa.

[21] Appl. No.: 127,601

[22] Filed: Mar. 5, 1980

[51] Int. Cl.³ .................. H02P 13/30; H02M 5/27
[52] U.S. Cl. ............................... 363/10; 363/160
[58] Field of Search ................. 363/9, 10, 159–162, 363/163

[56] References Cited

U.S. PATENT DOCUMENTS

| | | | |
|---|---|---|---|
| 3,148,324 | 9/1964 | Peaslee et al. | 363/162 |
| 3,704,408 | 11/1972 | Schroeder | 363/161 |
| 3,852,654 | 12/1974 | Gyugyi et al. | 363/161 |

Primary Examiner—William H. Beha, Jr.
Attorney, Agent, or Firm—G. H. Telfer

[57] ABSTRACT

The quality of the output waveform of a cycloconverter is greatly improved by a feedback loop that compensates for the inherent nonlinearity of the converter forward gain. A feedback signal, preferably proportional to the current through the shunt capacitor of the converter output filter, is multiplied by a compensating signal generated by full wave rectification of the cycloconverter AC reference signal with the resultant signal summed in opposition with the reference signal before it is applied to the converter control circuit. Alternatively a more precise compensating signal can be generated through 90° phase shifting and negative going full wave rectification of the sinusoidal cycloconverter reference signal.

8 Claims, 12 Drawing Figures

CYCLOCONVERTER WITH WAVEFORM IMPROVING NONLINEAR FEEDBACK

BACKGROUND OF THE INVENTION

1. Field of Invention

This invention relates to AC to AC static power frequency changers such as cycloconverters and, more particularly, to apparatus for improving the quality of the output waveforms of such frequency changers through the use of feedback.

2. Prior Art

Static power frequency changers such as cycloconverters are electronic devices which synthesize an output waveform of a desired frequency and amplitude from a multiphase, essentially sinusoidal AC voltage of a different frequency by generating a plurality of component waveforms from selected portions of the individual phases of the source voltage. Static power switches connected in the several phases of the source voltage are rendered conductive sequentially by a pattern of signals developed by a control circuit at firing angles related to the phases of the source voltage in such a manner that the sum of the component waveforms produces an output waveform with a mean signal level that follows a reference voltage having the desired output frequency. The output waveform is applied to a filter, usually a series inductor with a shunt capacitor, which extracts the desired fundamental output frequency from the composite waveform.

When built with present day semiconductor components, a highly efficient (94% or better) frequency converter is realized. The waveform quality, high efficiency and light weight of the cycloconverter make it a suitable candidate for aircraft electrical power systems where it is used to convert the variable frequency of the engine driven generator to a fixed frequency. The filter in such a system is very important because it suppresses unwanted frequency components from the output and hence has a direct bearing on the waveform quality. However, the filter also respresents a significant portion of the system weight which imposes practical limits on the amount of filtering that can be provided.

As in any control system, the output, which in the case of the cycloconverter is the filtered output, will not faithfully represent the reference signal due to system errors. Some of the errors in the cycloconverter are introduced by the filter itself which would suggest using the filtered output as a feedback signal in a negative feedback loop to reduce the errors. However, control theory demonstrates that the phase shift through the filter could contribute up to 180° to the closed loop phase lag and therefore create a severely unstable system. Even so, a small amount of feedback derived from the filtered output has been used successfully to provide some improvement in output waveform quality. In one such waveform improvement feedback scheme, the first derivative with respect to time of the output voltage as represented by the output filter capacitor current is used as the feedback signal. This approach effectively limits the filter's phase lag contribution to that of the filter's inductor only, or 90°. Hence a 90° improvement in system gain phase margin is realized permitting larger feedback gain and less error. This is a form of linear feedback that is commonly used in power conversion systems, however, it gives rise to a very nonlinear total loop gain, as will be discussed, which limits its effectiveness.

It is, therefore, a primary object of the present invention to improve the quality of the output waveform of a cycloconverter.

It is also an object of the invention to achieve improved cycloconverter output waveform quality through an improved form of feedback control.

It is another object of the invention to provide such feedback control which accommodates for the nonlinearity of the cycloconverter feed forward loop gain.

It is a more specific object of the invention to provide feedback which accommodates for the nonlinearity of the feed forward gain of the cycloconverter by varying the feedback gain as a function of the firing angle of the cycloconverter thyristor power circuit.

It is still another object of the invention to realize all of the foregoing objects through a scheme which is simple, reliable and inexpensive to implement.

SUMMARY OF THE INVENTION

The present invention is based upon the realization that the feed forward gain of the cycloconverter is nonlinear and in fact varies as a function of the firing angle of the thyristors in the converter power circuit. This gain is a minimum when the firing angle is near 0° or 180° and is a maximum at 90°. Where linear feedback has been used in prior art cycloconverters to improve output waveform quality, it has been necessary to limit the amount of feedback, and therefore the improvement in output waveform quality, to ensure stability throughout the range of firing angles.

According to the present invention, the cycloconverter filtered output feedback gain is varied in a manner which compensates for the nonlinearity in the feed forward gain to provide a total loop gain that is more nearly linear. With such an arrangement, higher feedback gain can be used with a resultant overall improvement in output waveform quality.

In the preferred embodiment of the invention, the feedback signal is multiplied by a compensating signal generated through full wave rectification of the cycloconverter reference signal. This surprisingly simple approach produces a total loop gain which is larger in magnitude at the peaks and smaller in magnitude at the zero crossings of the cycloconverter output voltage than the feed forward cycloconverter gain and provides very satisfactory results.

More precise compensation can be realized through a second embodiment of the invention in which the compensating signal is generated through negative full wave rectification of the cycloconverter reference signal and a 90° phase shift of the signal. This approach though more complex to implement provides nearly linear total loop gain and therefore is a very good approximation of the ideal system.

DESCRIPTION OF THE PREFERRED EMBODIMENTS

Figure 1:
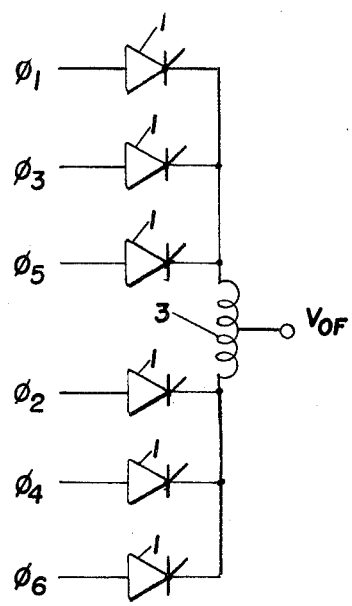
FIG. 1 is a schematic circuit diagram of the positive bank of a six pulse cycloconverter power circuit.

FIG. 1 illustrates the positive bank of a typical cycloconverter power circuit for generating a single phase unfiltered output voltage $V_{OF}$ from a six phase AC source. In such a cycloconverter, the anode of a thyristor 1 is connected to each phase of the AC source. The thyristors are arranged in two, three-pulse groups by connecting the cathodes of the thyristors associated with phases 1, 3 and 5 and those associated with phases 2, 4 and 6 together and to opposite ends of an interphase transformer 3. The unfiltered output voltage $V_{OF}$ of the bank is generated at the center tap of the interphase transformer. This positive bank carries the positive load current for the cycloconverter and a similar thyristor bank, but with the polarity of the thyristors reversed, is provided for carrying the negative load current. The arrangement of the thyristors in two, three-pulse groups is not critical to the invention but is illustrative only of a typical power circuit.

Figure 2:
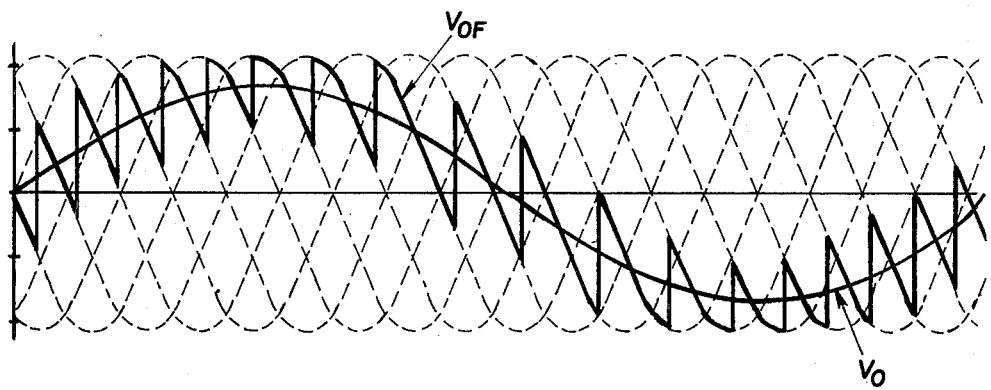
FIG. 2 is a waveform diagram illustrating the relationship of the six input phase voltages and the filtered and unfiltered output voltages of the cycloconverter positive bank shown in FIG. 1.

The gate electrodes of the thyristors 1 of the power circuit are pulsed sequentially by signals generated by a control circuit to produce a composite waveform $V_{OF}$, shown in FIG. 2 for the positive bank, from selected portions of the six phases of the source voltage. This composite waveform is then passed through the output filter to generate the filtered output waveform $V_O$ having the frequency of the reference signal applied to the control circuit. While the output voltage generated by the positive thyristor bank is positive for 180° and negative for the other 180°, the thyristors can only pass current in one direction. The 180° portion of the waveform shown in FIG. 2 during which the positive bank is carrying the load current will depend upon the load current power factor. Related waveforms are developed by the negative thyristor bank to provide a continuous output current.

Figure 3:
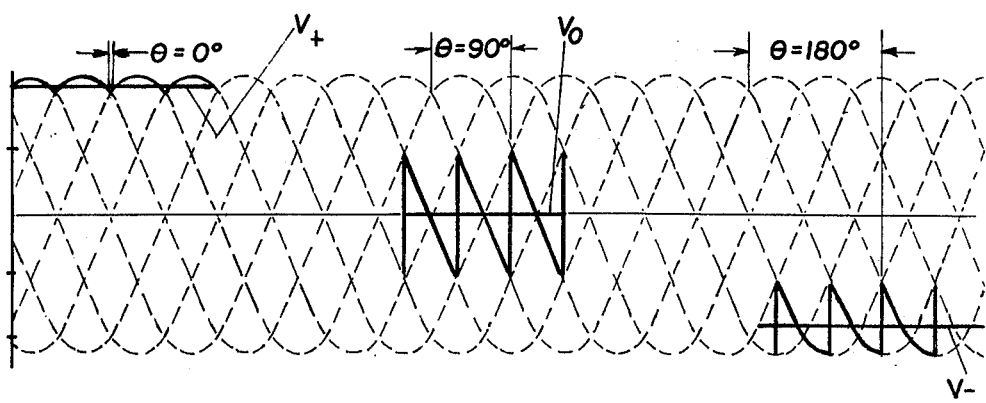
FIG. 3 is a waveform diagram illustrating the cycloconverter output voltages generated at selected thyristor firing angles.

It will be noticed from studying FIG. 2 that as the successive thyristors are turned on by the control circuit, the instantaneous phase voltage applied to the oncoming thyristor is always higher than that applied to the preceding thyristor. In this manner each thyristor, which is turned on by a pulse applied to its gate electrode, is turned off by the next succeeding thyristor. Such an arrangement is referred to as a naturally commutated power circuit. The instant relative to the associated source phase voltage that each successive thyristor is turned on is referred to as the firing angle. While various reference points for measuring firing angles can be used, the earliest instant that a particular thyristor can be turned on, that is, the instant when the associated phase voltage first rises above the phase voltage applied to the preceding thyristor, will be used in this discussion. Thus, referring to FIG. 3, when the firing angle $\theta$ is 0°, the maximum positive filtered output voltage $V_+$ is generated. On the other hand, if the firing angle were 180°, the maximum negative output voltage $V-$ would be generated. Actually, a firing angle of 180° is generally not attainable due to generator inductance and the finite commutation time required for thyristors. Thus the maximum negative filtered output voltage $V-$ is usually smaller in magnitude than the maximum positive voltage attainable and results from a firing angle somewhat less than 180°, such as 150° as illustrated in FIG. 3. As can be seen also from FIG. 3, when the firing angle is 90° the filtered output voltage $V_O$ is zero.

Figure 4:
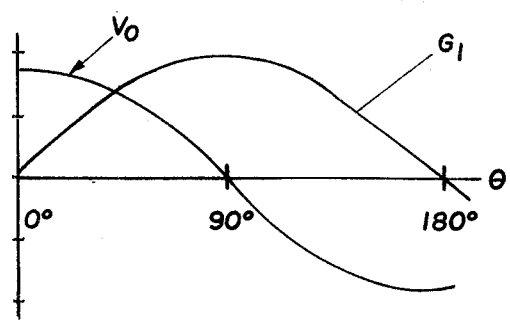
FIG. 4 is a diagram illustrating the relationship of the output voltage and forward gain of a cycloconverter to the firing angle of the thyristors in the power circuit of FIG. 1.

It can be appreciated from studying FIGS. 2 and 3 that in generating a sine wave converter output the thyristor firing angle must change continuously. In fact, FIG. 4 illustrates that the instantaneous output voltage of the cycloconverter, $V_o$, is a cosine function of the firing angle, $\theta$. By taking the first derivative of this function with respect to $\theta$ the incremental feed forward gain $G_1$ of the converter is determined. It is apparent that as the output voltage nears a peak, positive or negative ($\theta = 0°$ or 180°), it becomes insensitive to change in the firing angle $\theta$ (low gain) and at zero voltage ($\theta = 90°$) it is most sensitive to changes in firing angle (high gain).

Figure 5:
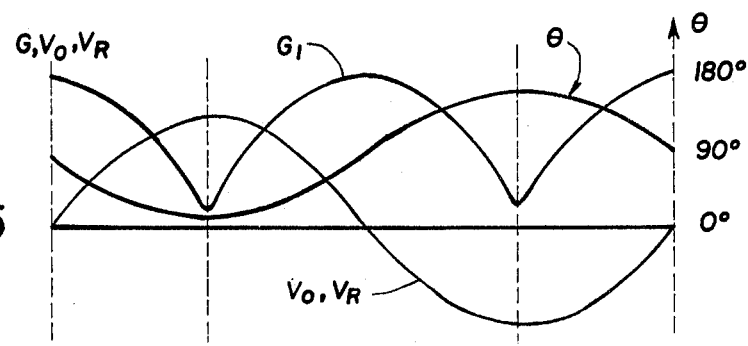
FIG. 5 is a waveform diagram illustrating the relationship in the time domain of the output voltage, the forward gain and the thyristor firing angle in a typical cycloconverter such as that shown in FIG. 1.

By mapping FIG. 4 from the $\theta$ domain to the time domain, FIG. 5 is obtained which shows the cycloconverter forward gain $G_1$ as a function of time over one cycle of the output voltage for the positive bank. The output voltage $V_O$, which in the ideal case will faithfully follow the reference voltage $V_R$, is also shown in the Figure. This Figure shows that the firing angle $\theta$ does not reach 0° which merely implies that the converter is not reaching maximum rectifying voltage. That is, the system is operating with a modulation factor of less than 1.0.

Where the prior art linear feedback is used in an attempt to improve waveform quality, the total loop gain will, of course, exhibit the same waveform as $G_1$ except for a scale factor. Under such circumstances, the loop gain will vary in time such that at the voltage peaks the gain will be low resulting in minimum suppression of error while at the voltage zeros, the gain will be high with maximum error suppression. This has been repeatedly observed in an operating system as a rather flattened waveform at the voltage peaks. Such flattening causes third harmonic content in the cycloconverter output voltage.

Figure 6:
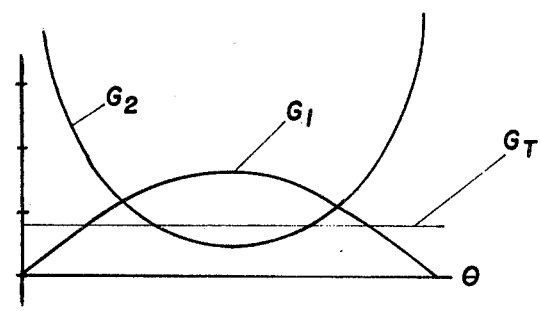
FIG. 6 is a diagram illustrating the forward gain, the ideal feedback gain and the resultant total loop gain of a cycloconverter as a function of the thyristor firing angle.
Figure 7:
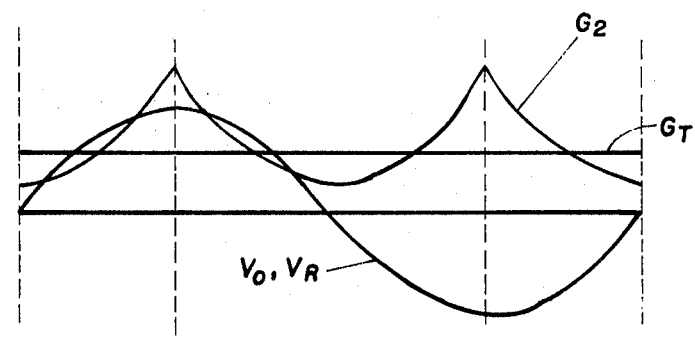
FIG. 7 is a waveform diagram illustrating in the time domain the relationship of the ideal feedback gain, the total gain and cycloconverter output voltage.

As in any feedback control system, loss of control or instability will result if the feedback or loop gain is too high. In the cycloconverter this loss of control will be determined by the peak gain near zero crossover, yet there will be insufficient gain (or large error) near the peaks. It is desirable, therefore, to provide a system in which the total gain is linear and so does not vary with time. This can be accomplished with the cycloconverter by using a nonlinear feedback gain which compensates for the inherent nonlinearities of the feed forward gain. For instance, as shown in FIG. 6, the compensating feedback gain $G_2$ when applied with the nonlinear feed forward gain $G_1$ results in a linear total gain $G_T$. Such a system gives equal gain and hence equal error control at voltage peaks and voltage zeros. Maximum loop gain can be used under these circumstances and hence maximum benefit is achieved. The feedback gain and the total loop gain for such an ideal system are illustrated as a function of time in FIG. 7 together with the output voltage $V_O$. This figure has been aligned vertically with FIG. 5 to illustrate the phase relationship of the feedback gain and the feed forward gain. Since the total system gain is equal to the feed forward gain multiplied by the feedback gain, the gain $G_2$ for the feedback loop can be derived as follows:

$$G_2 = \frac{1}{G_1} = \frac{1}{\frac{dV_O}{d\theta}} = \frac{d\theta}{dV_O} \quad (1)$$

Where $V_O = V\text{COS }\theta$ (2)

Hence $G_2 = \frac{1}{-V\text{SIN }\theta}$ (3)

One method of generating $G_2$ is to derive $d\theta/dV_O$. This requires the differentiation of one variable with respect to another. Generally it is easier in analog circuits to differentiate with respect to time rather than another variable. Hence, one approach is to differentiate both with respect to time and divide as follows:

$$\frac{dV_O}{dt} \bigg/ \frac{d\theta}{dt} = \frac{dV_O}{d\theta} \quad (4)$$

Figure 8:
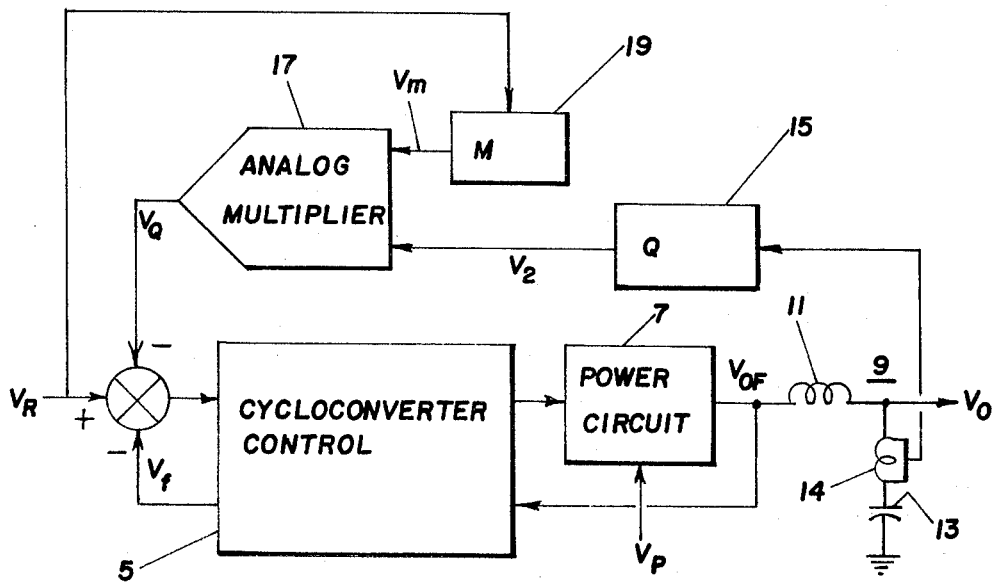
FIG. 8 is a schematic diagram of a cycloconverter according to one embodiment of the present invention.

A cycloconverter which operates approximately in this manner is shown in FIG. 8 where a sinusoidal reference signal $V_R$ is summed in opposition to an unfiltered output voltage feedback signal $V_f$ to generate an error signal which is applied to a control circuit 5. A suitable control circuit is disclosed in commonly owned copending application Ser. No. 95,898 filed Nov. 19, 1979. The integral control circuit therein described generates firing pulses for the thyristors of a power circuit 7 which includes a positive thyristor bank as shown in FIG. 1 and a corresponding negative bank. The power circuit gates portions of the six phase source voltage $V_P$ to generate the unfiltered output waveform $V_{OF}$ which is illustrated in FIG. 2. This waveform is passed through the filter 9 having a series inductor 11 and shunt capacitor 13 to produce the filtered output signal $V_O$ and is used in the control circuit loop as $V_F$.

The cycloconverter output is applied to a feedback element 15 having a transfer function Q. Preferably, the feedback signal is the first derivative of the output voltage since this limits the phase shift of the feedback signal to 90° as discussed above. This can be achieved by using a differentiator for the feedback element 15; however, a representation of the first derivative of the output voltage $V_O$ is readily available in the form of the current through the shunt capacitor 13 of the output filter 9 as measured by the current transformer 14. In this case the transfer function Q of the feedback element 15 is a simple proportionality factor. In either case, the feedback gain to this point is linear although perhaps shifted in phase so that, without compensation, the nonlinearity of the cycloconverter feed forward gain would still produce the undesirable results previously discussed.

Complementary compensation is provided for the output $V_2$ of feedback element 15 by multiplier 17. While ideally the correction factor should be the first derivative of the firing angle $\theta$ as suggested by equation (4), the angle $\theta$ is not readily available. However, observation of the curve $G_2$ in FIG. 7 suggests that the function $d\theta/dV_O$ resembles a negative going full wave rectified sine wave signal. In reality, it is proportional to $1/\sin \theta$; however, it has been found that negative full wave rectification of the reference voltage applied to the cycloconverter produces a signal which approximates this function very well. The proper phase relationship is created by using the reference voltage since, of course, it is the reference voltage which generates the phase angle.

Figure 10:
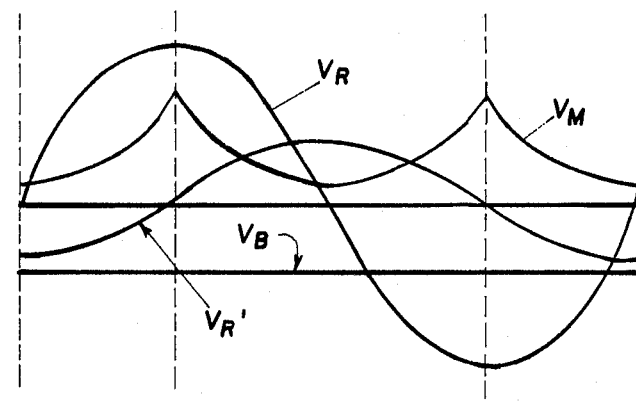
FIG. 10 is a waveform diagram illustrating the operation of the circuits of FIGS. 8 and 9.
Figure 9:
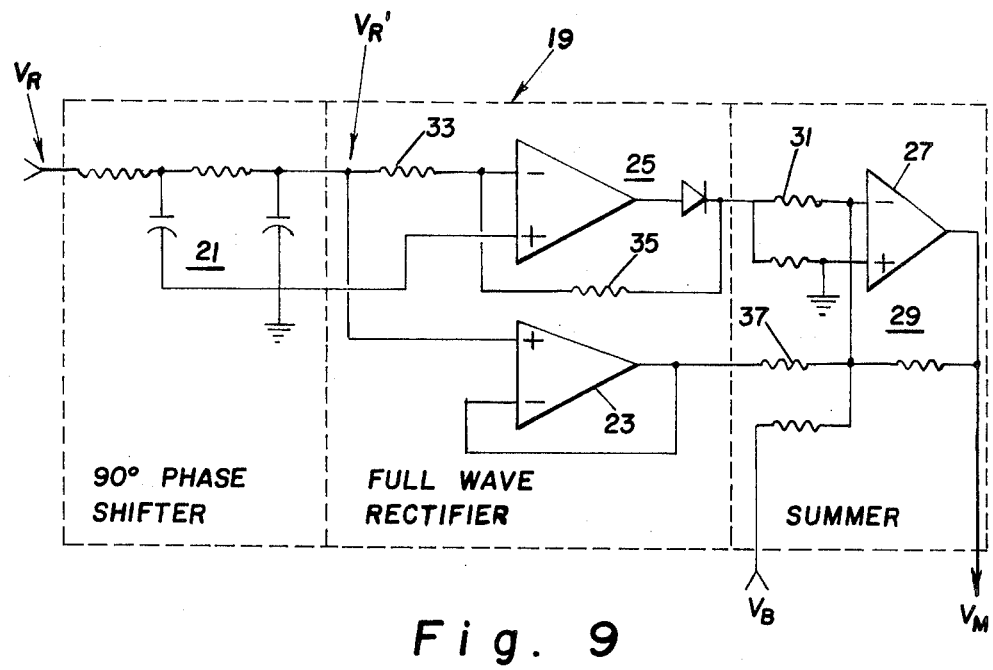
FIG. 9 is a schematic diagram in more detail of a portion of the cycloconverter illustrated in FIG. 8.

The signal generator 19 in FIG. 8 generates the appropriate negative full wave signal $V_M$ from the reference voltage $V_R$. A suitable circuit for carrying out this function is shown in FIG. 9. The reference voltage $V_R$ is first phase shifted 90° by the RC phase shifter 21. The resultant signal $V_R'$ is applied to a voltage follower 23 and a positive half-wave rectifier 25, the outputs of which are both applied to the inverting input of an op amp 27 in summer 29. The outputs of voltage follower 23 and half-wave rectifier 25 are opposite in polarity and the value of resistor 31 is equal to one-half the value of resistors 33, 35 and 37 so that the positive half-wave currents generated by the half-wave rectifier 25 are equal to twice the magnitude of the negative half-waves passed by the voltage follower 23. This results in a positive full wave rectified signal which is inverted by the summer amplifier 27 to produce a negative full wave rectified signal. A negative bias $V_B$ is added to the inverting input of op amp 27 to make the signal $V_M$ positive. The relationship between $V_R$, $V_R'$, $V_M$ and $V_B$ is shown in FIG. 10. Comparison of this Figure with FIG. 7 reveals the degree to which the negative going full wave rectified reference signal approximates the ideal correction factor.

The compensating signal $V_M$ is applied to the multiplier circuit 17 together with the signal $V_2$ and the resultant feedback signal is summed in opposition with the reference signal to complete the negative feedback loop. Since the gain generated by the feedback loop is complementary to the feed forward gain of the converter, the total loop gain is essentially linear.

Figure 11:
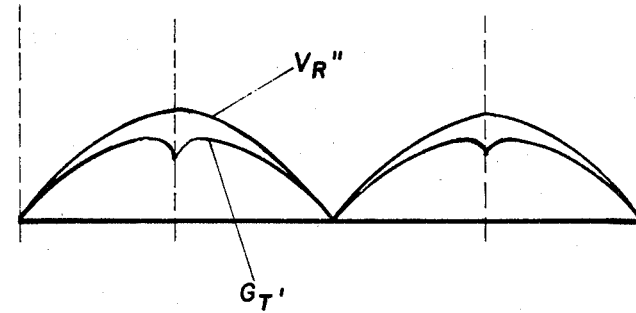
FIG. 11 is a waveform diagram illustrating the operation of a second embodiment of the invention.

While the system of FIGS. 8 and 9 described above provides essentially linear loop gain with the attendant advantages, it has been found that satisfactory results can be obtained through modulation of the loop gain by the rectified cycloconverter reference signal itself. As shown in FIG. 11 wherein $V_R''$ represents the full wave rectified reference voltage and $G_T'$ represents the total loop gain derived by multiplying $V_R''$ by $G_1$ (from FIG. 5), this approach provides an increased loop gain at the voltage peaks as required, yet the gain near the voltage zeros is low to offset the inherently high feed forward gain of the cycloconverter. By adding a bias to the rectified reference, the zero voltage gain can be made larger than zero thus giving a better approximation of the ideal case.

Figure 12:
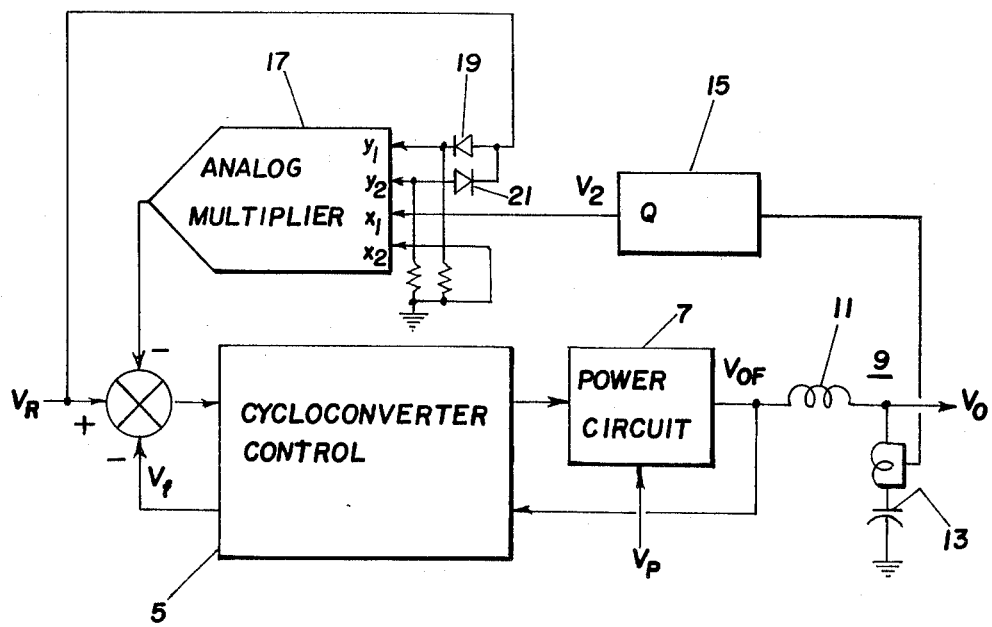
FIG. 12 is a schematic diagram of a second embodiment of the invention which operates in the manner illustrated in FIG. 11.

Implementation of this embodiment of the invention is illustrated in FIG. 12. The reference signal $V_R$ is applied to the Y inputs of the multiplier 17 through rectifying diodes 19 and 21. While this solution to the problem is surprisingly simple, experiments have proven it to be very effective as illustrated by the following test results in which column A reports the distortion factor using linear feedback and column B provides the results achieved on the same cycloconverter using the rectified reference signal to modulate the feedback signal:

TABLE I

| Load | A | B |
|---|---|---|
| None | 4% | 3% |
| 26 KVA (.75 power factor) | 5.5% | 4% |
| 30 KVA (.75 power factor) | 6% | 4.5% |

As can be seen from these test results, distortion was improved by 1 to 1.5% using the simplified scheme of FIG. 12.

It should be appreciated that while the invention has been described as applied to a cycloconverter using integral control which incorporates a feedback loop as part of the control circuit, it is equally compatible with cycloconverters utilizing other control circuits, such as the cosine wave crossing control scheme. In such an application only the feedback signal from the multiplier would be summed in opposition with the reference to generate the error signal for the cycloconverter control circuit.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for synthesizing from a multiphase AC source voltage an output waveform which follows an AC reference waveform comprising:
   a naturally commutated thyristor power circuit connected across the multiphase AC source;
   a control circuit for sequentially firing the thyristors in said power circuit at firing angles determined as a function of an AC control signal to generate an unfiltered output voltage from said power circuit;
   an output filter for generating a filtered output voltage from said unfiltered output voltage; and
   a feedback circuit comprising
   (a) means for generating a feedback signal proportional to the filtered output voltage,
   (b) means for generating a compensating signal having a magnitude which varies as a function of said firing angle,
   (c) means for multiplying said feedback signal by said compensating signal to generate a compensated feedback signal, and
   (d) means for summing said compensated feedback signal in opposition with said reference waveform to generate said control signal.

2. The apparatus of claim 1 wherein said means for generating said compensating signal comprises means for generating a signal which has an increased magnitude at firing angles which generate peak output voltages and a decreased magnitude at firing angles which generate zero crossings of the output voltages.

3. The apparatus of claim 2 wherein said output filter includes a series inductor and a shunt capacitor and said means for generating a feedback signal includes means for generating the feedback signal as a function of the current through said shunt capacitor.

4. The apparatus of claim 2 or 3 wherein said means for generating said compensating signal comprises means for generating from said reference waveform a full wave rectified compensating signal.

5. The apparatus of claim 2 or 3 wherein said means for generating said compensating signal comprises means for generating a 90° phase shifted negative going full wave rectified signal from said reference waveform.

6. The apparatus of claim 5 including means for adding bias to said 90° phase shifted negative going full wave rectified signal to provide a selected approximately linear total loop gain.

7. Apparatus for generating from a multiphase AC source voltage an output waveform which follows a sinusoidal reference waveform, said apparatus comprising:
   a cycloconverter connected to the multiphase AC source to generate an output voltage which follows the reference waveform applied thereto, said cycloconverter including an output filter having a series inductor and a shunt capacitor; and
   a feedback circuit comprising means for generating a feedback signal proportional to the current through said shunt capacitor, means for generating a compensating signal through full wave rectification of the reference waveform, means for multiplying the feedback signal by the reference signal to generate a modified feedback signal and means for modifying the reference waveform which is applied to the cycloconverter by said modified feedback signal.

8. Apparatus for generating from a multiphase AC source voltage an output waveform which follows a sinusoidal reference waveform, said apparatus comprising:
   a cycloconverter connected to the multiphase AC source to generate the output waveform which follows the reference waveform applied thereto, said cycloconverter including an output filter having a series inductor and a shunt capacitor; and
   a feedback circuit comprising means for generating a feedback signal proportional to the current through said shunt capacitor, means for generating from the reference waveform a 90° phase shifted and negative going full wave rectified compensating signal, means for multiplying said feedback signal by said compensating signal to generate a modified feedback signal and means for adding said modified feedback signal in opposition to said reference waveform to generate a modified reference waveform which is applied to said cycloconverter.

* * * * *